United States Patent

Gallitzendörfer et al.

Patent Number: 4,518,197
Date of Patent: May 21, 1985

[54] WATER GUIDE CHANNEL FOR MOTOR VEHICLES

[75] Inventors: Joseph Gallitzendörfer, Sindelfingen; Peter Pfeiffer, Boeblingen; Johann Tomforde, Sindelfingen; Jochen Pärisch, Herrenberg; Gerhard Zweigart, Aidlingen, all of Fed. Rep. of Germany

[73] Assignee: Daimler-Benz Aktiengesellschaft, Stuttgart, Fed. Rep. of Germany

[21] Appl. No.: 486,945

[22] Filed: Apr. 20, 1983

[30] Foreign Application Priority Data

Apr. 22, 1982 [DE] Fed. Rep. of Germany ....... 3214876

[51] Int. Cl.³ ............................................. B62D 25/00
[52] U.S. Cl. .................................................... 296/213
[58] Field of Search ......................................... 296/213

[56] References Cited

U.S. PATENT DOCUMENTS

| | | | |
|---|---|---|---|
| 3,666,316 | 5/1972 | Wilfert | 296/213 |
| 4,304,435 | 12/1981 | Everts | 296/213 |
| 4,355,843 | 10/1982 | Murakami | 296/213 |

FOREIGN PATENT DOCUMENTS

| | | |
|---|---|---|
| 6808025 | 11/1968 | Fed. Rep. of Germany . |
| 1802853 | 5/1970 | Fed. Rep. of Germany . |
| 1505588 | 7/1970 | Fed. Rep. of Germany . |
| 2137516 | 2/1973 | Fed. Rep. of Germany . |
| 2414157 | 10/1975 | Fed. Rep. of Germany . |
| 1511782 | 5/1978 | United Kingdom . |

Primary Examiner—Robert R. Song
Attorney, Agent, or Firm—Jerold M. Forsberg

[57] ABSTRACT

Water guide channels for motor vehicles are known, which have a continuous profile strip running along the windscreen pillar and the roof, the profile strip having a constant cross-sectional shape over its entire length.

In order to optimize an arrangement of this type, it is proposed that in the region of the windscreen pillar, the profile strip form a wall part of a water guide channel open towards the center of the vehicle and, that, in the approximately horizontal roof region, it completely covers up the top of a channel formed by depressions in the external skin of the roof thereby forming the water guide channel by a leg of the profile strip, and the external skin of the roof.

6 Claims, 3 Drawing Figures

WATER GUIDE CHANNEL FOR MOTOR VEHICLES

TECHNICAL FIELD

The invention concerns a water guide channel for motor vehicles with a continuous profile strip running along the windscreen pillar and the roof, the profile strip having a constant cross-sectional shape over its entire length.

BACKGROUND ART

A water guide gutter of this type has already been disclosed in German Pat. No. 1,505,588. The known arrangement has, in the region of the windscreen pillars, a covered water guide channel which is not, during travel, capable of capturing and removing water streaming sideways away from the windscreen and thus preventing the side windows of the vehicle from becoming dirty. In the roof region, in the known embodiment according to German Pat. No. 1,505,588, the profile strip is pushed onto a sideways protruding flange of the roof frame, which represents a high risk in an accident, for example, impact with a pedestrian. In addition, such a rain gutter in this region is extraordinarily unfavorable in aerodynamic respects because of the vortex formation associated with it.

SUMMARY OF THE INVENTION

The object of the present invention is, therefore, to optimize a water guide channel of the type defined at the beginning with respect to the above functions.

This object is achieved, according to the invention, by the profile strip in the region of the windscreen pillar forming a wall part of a water guide channel open towards the center of the vehicle, and by the profile strip, in the approximately horizontal roof region, completely covering up the top of a channel formed by depressions in the external skin of the roof and forming the water guide channel there by means of the free end of its leg and the external skin of the roof.

In an advantageous embodiment of the profile strip, provision is made for it to have a leg, which is connected via an intentional bending position to a foot part, which serves the establishment of a clip connection with a complementary part fastened to the vehicle. The intentional bending position then makes possible easy matching of the profile strip to the course of the water guide corresponding to the local features of the vehicle and fastening to the vehicle is possible without problems by means of the foot part.

These and other objects, features and advantages of the present invention will become more apparent from the following description when taken in connection with the accompanying drawing which shows, for purposes of illustration only, one embodiment in accordance with the present invention.

DESCRIPTION OF THE INVENTION

Figure 1:
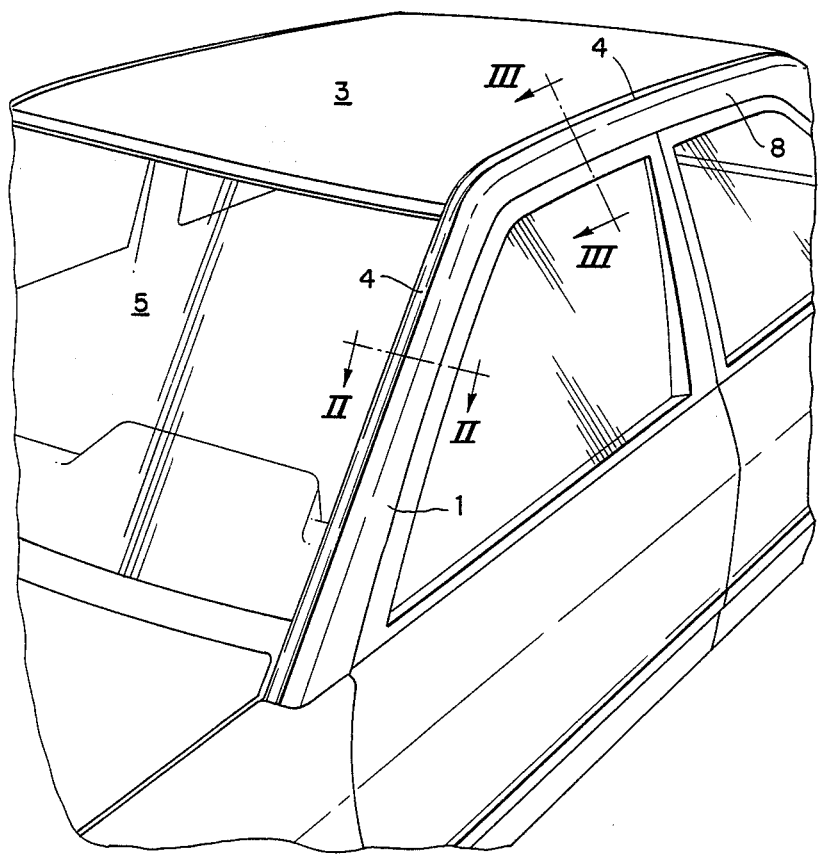
FIG. 1 shows a perspective view of the windscreen pillar and roof region of a passenger car.

The passenger car shown in the drawing has, in the region of its windscreen pillar 1, a water guide channel 2, which is open towards the center of the vehicle and, in its further course, is formed by the external skin of the roof 3 and a profile strip 4.

In the region of the windscreen pillar 1, the water guide channel 2 is formed by the windscreen 5, the profile strip 4 and an elastomer sealing profile 6 sealing the windscreen 5. The profile strip 4, which can be produced, for example, as an extruded plastic profile or as an aluminum extruded profile, has a leg 4a, which passes into a foot part 4c via an intentional bending position 4b. Foot part 4c is clipped onto a retaining profile 7 formed in the elastomer sealing profile 6.

Figure 3:
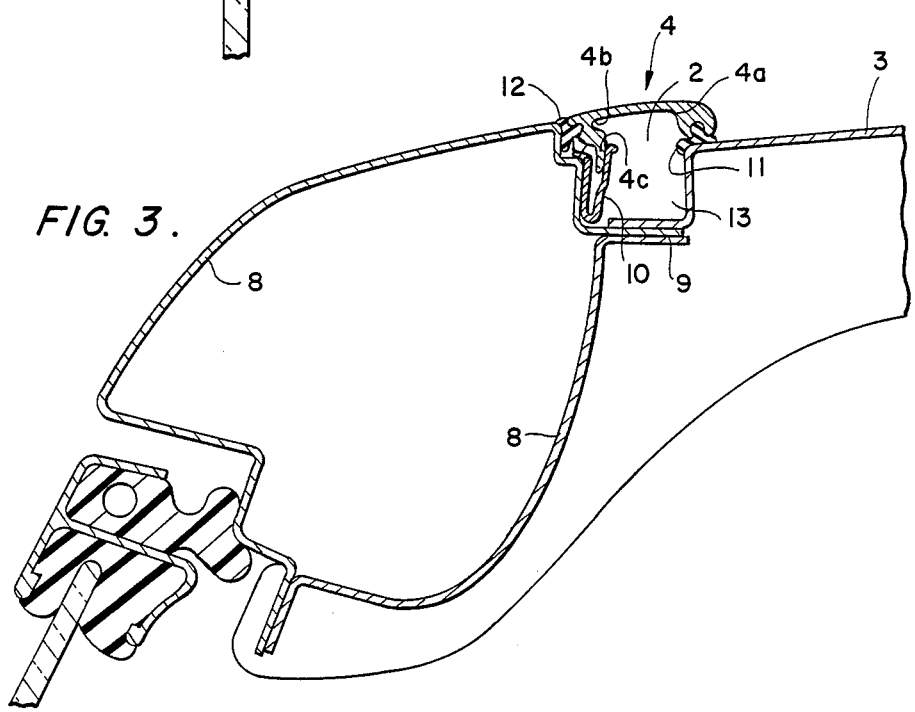
FIG. 3 shows a section along the line III—III in FIG. 1, also in a larger scale.

Whereas the profile strip 4 thus forms only a part of the water guide channel 2 in the region of the windscreen pillar 1, it serves additionally in the region of the roof 3, as shown in FIG. 3 of the drawing, to cover a channel 13.

Channel 13 is formed by parts of the external skin of the roof 3 and a side roof frame 8, which are welded together by means of edge flanges at 9. In this region, the foot part 4c of the profile strip 4 is fastened to the vehicle by spring clips 10.

Figure 2:
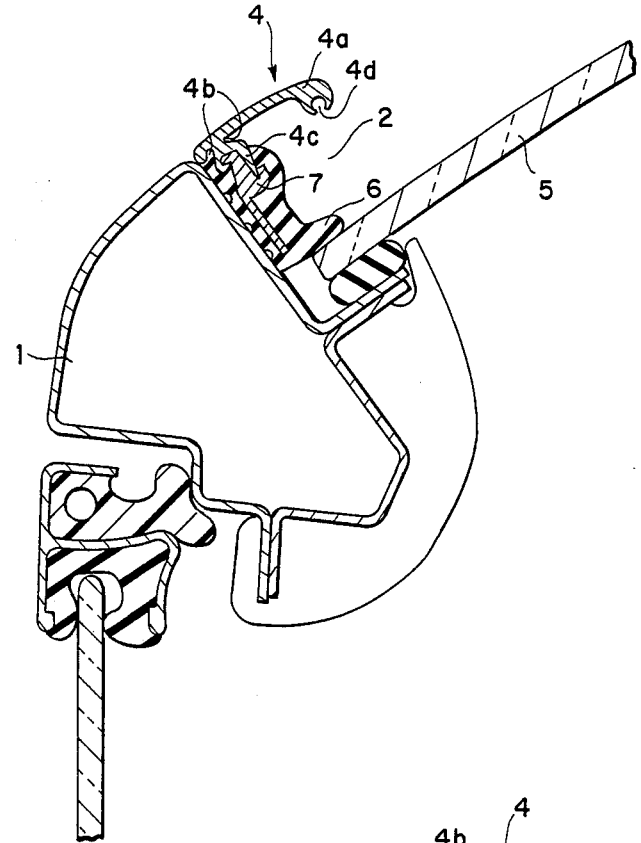
FIG. 2 shows a section along the line II—II in FIG. 1, in a larger scale.

The free end of the leg 4a of the profile strip has a groove 4d (FIG. 2), which serves to accept a tolerance-compensating sealing profile 11 (FIG. 3) provided in the roof region. A further sealing profile 12 is retained by the outer region of the intentional bending position 4b.

The weakening of the material present in the region of the intentional bending position 4b makes possible a satisfactory adaptation of the profile strip 4 to the course of the water guide channel 2 and of the channel 13. A certain amount of staggering is also possible without difficulty, for example, in the transition region to the roof 3. In addition, this arrangement of the profile strip offers the advantage that on impact by a pedestrian on the inner side of the windscreen pillar, the profile strip is rotated inwards so that a direct edge impact is prevented.

In the region of the windscreen pillar, the profile strip ends at the bottom preferably in a well or the like, serving to accept recessed windscreen wipers. A simple length compensation is attained by the covered outlet.

While we have shown and described one embodiment in accordance with the present invention, it is understood that the same is not limited thereto but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. A water guide channel for motor vehicles comprising a continuous profile strip running along the windscreen pillar and the roof of a motor vehicle, the profile strip having a constant cross-sectional shape over its entire length, the profile strip in the region of the windscreen pillar forming a wall part of a water guide channel open towards the center of the motor vehicle, the profile strip in a generally horizontal roof region completely covering the top of a channel formed by depressions in an external skin of the roof thereby forming the water guide channel in the roof region by means of a free end of a leg of the profile strip and the external skin of the vehicle roof.

2. The water guide channel according to claim 1, wherein the profile strip includes another leg, connected to a foot part means for establishing a clip connection to a complementary part fastened to the vehicle.

3. The water guide channel according to claim 1, wherein a retaining profile in the region of the windscreen pillar is provided in an elastomer sealing profile of the windscreen, this retaining profile working together with the foot part means of the profile strip for fixing the position of the profile strip.

4. The water guide channel according to claim 1, wherein the foot part means in the roof region of the profile strip is retained by spring clips.

5. The water guide channel according to claim 1, wherein the leg of the profile strip has a groove at its free end for accepting a sealing profile provided in the roof region.

6. The water guide channel according to claim 1, wherein an external region of the profile strip serves to retain a further sealing profile.

* * * * *